United States Patent Office 3,213,081
Patented Oct. 19, 1965

3,213,081
BENZOTHIAZOLE AZO COMPOUNDS
James M. Straley and David J. Wallace, Kingsport, Tenn., assignors to Eastman Kodak Company, Rochester, N.Y., a corporation of New Jersey
No Drawing. Filed Jan. 11, 1963, Ser. No. 250,784
12 Claims. (Cl. 260—155)

This invention relates to novel compounds containing a dicarboximido radical, and more particularly to azo compounds, such as azo dyestuffs, containing a dicarboximido radical. Particular azo compounds containing this radical include compounds obtained by coupling diazotized 2-amino benzothiazoles with dicarboximidoalkyl tetrahydroquinoline coupling components.

These particular azo compounds have the general formula (I)
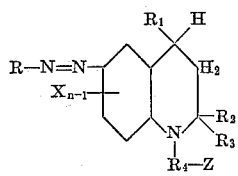

wherein
R=a 2-benzothiazolyl radical, i.e.,

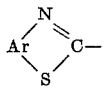

in which Ar is an ortho-phenylene radical, such as present in 2-aminobenzothiazole and the substituted 2-aminobenzothiazoles described in the example below; the alkylsulfonyl, nitro, cyano and cyanoalkylsulfonyl substituted 2 - aminobenzothiazoles being particularly efficacious for use in preparing the azo compounds;
$R_1$, $R_2$ and $R_3$ each equal a hydrogen atom or a lower alkyl group, particularly methyl;
$Y_{n-1}$=the substituents, if any, in at least one of the 5-, 7-, or 8-positions of the tetrahydroquinoline nucleus wherein
Y is either a lower alkyl group, particularly methyl; a lower alkoxy group, particularly methoxy; or a halogen atom, including a chlorine atom or a bromine atom;
$n$=a positive integer from 1 to 4;
$R_4$=an alkylene group straight or branch-chained, particularly lower alkylene, such as —$(CH_2)_{n'}$— wherein $n'$ is a positive integer from 1 to 4,
Z=a dicarboximido radical such as phthalimido, succinimido, maleimido, citraconimido, etc., as indicated in the examples below, derived from the corresponding anhydride.

The 2-aminobenzothiazoles which are diazotized and coupled with the mentioned coupling components are, for example, 2-aminobenzothiazole, 2-amino-6-alkylsulfonylbenzothiazoles and other 2-aminobenzothiazoles disclosed in the examples hereinafter.

The dicarboximidoalkyl tetrahydroquinoline coupling components of the invention which are coupled with the diazotized 2-aminobenzothiazoles, have the following general formula (II)
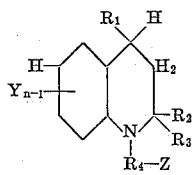

wherein R, $R_2$, $R_3$, $R_4$, Y, $n$ and Z have the same meaning as given above.

The dicarboximido radical Z of the azo compounds and coupling components of Formulas I and II above, has the following general formula

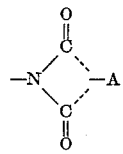

wherein "A" represents the atoms necessary to complete a ring containing 4 or 5 carbon atoms in addition to the nitrogen atom, i.e., the hydrocarbon residue of the dicarboxylic acid anhydride from which the radical is derived, including substituted and unsubstituted alkylene, vinylene and ortho-phenylene groups, such as the alkylene group —$CH_2CH_2$— in the succinimido radical

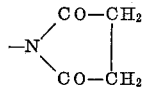

The dicarboximidoalkyl tetrahydroquinoline coupling components are obtained as described in the following typical reaction, by the condensation of a dicarboxylic acid anhydride with an N-aminoalkyltetrahydroquinoline.

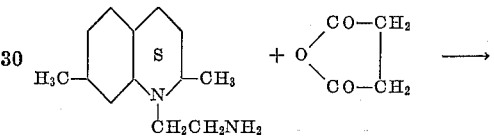

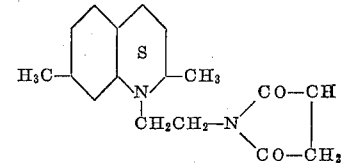

Representative 5- and 6-membered cyclic dicarboximidoalkyl tetrahydroquinoline couplers referred to in the examples below, useful for preparing the azo compounds are N-β-succinimidoethyl-1,2,3,4-tetrahydroquinoline
N-succinimidomethyl-1,2,3,4-tetrahydroquinoline
N-β-succinimidoethyl-2,7-dimethyl-1,2,3,4-tetrahydroquinoline
N-β-phthalimidoethyl-1,2,3,4-tetrahydroquinoline
N-β-succinimidoethyl-2,2,4,7-tetramethyl-1,2,3,4-tetrahydroquinoline
N-α-succinimidopropyl-2,7-dimethyl-1,2,3,4-tetrahydroquinoline
N-β-succinimidoethyl-2,2,4-trimethyl-1,2,3,4-tetrahydroquinoline
N-β-succinimidoethyl-2-methyl-1,2,3,4-tetrahydroquinoline
N-β-succinimidoethyl-2-isopropyl-7-methoxy-1,2,3,4-tetrahydroquinoline The azo compounds can be used for dyeing textile materials including synthetic polymer fibers, yarns and fabrics giving fast pink to violet shades when applied by conventional dyeing methods to cellulose ester and polyester fibers. The azo compounds have moderate affinity for polyamide fibers and possess the valuable property of staining wool less than do previous benzothiazole dyes. When the azo compounds are used for dyeing such hydrophobic materials, they should be free of water-solubilizing groups such as sulfo and carboxyl groups. In general the dyes have good fastness, for example, to light, washing, gas (atmospheric fumes) and sublimation. The dyes are useful in application and discharge printing.

The following examples will serve to illustrate the preparation of representative intermediates and azo compounds of our invention.

EXAMPLE 1.—N-β-SUCCINIMIDOETHYL-2,7-DI-METHYL-1,2,3,4-TETRAHYDROQUINOLINE 20.4 g. (0.1 m.) N-2-aminoethyl-2,7-dimethyl-1,2,3,4-tetrahydroquinoline, 10.0 g. (0.1 m.) succinic anhydride, and 1 g. sulfanilic acid were heated at 140–150° C. for 1 hour. The reaction mixture was poured into 300 ml. of ethanol and this suspension was heated to solution. On cooling, a solid resulted. Yield—8.3 g., M.P. 142–145° C. Recrystallized from ethanol the product melted at 146–147° C. The course of the reaction is provided above.

EXAMPLE 2.—N-β-SUCCINIMIDOETHYL-1,2,3,4-TETRAHYDROQUINOLINE 17.6 g. (0.1 m.) N-2-aminoethyl-1,2,3,4-tetrahydroquinoline and 10.0 g. (0.1 m.) succinic anhydride were heated together at 135–140° C. for 1 hour. This mixture was poured while hot into 200 ml. of ethanol. On cooling, the product crystallized. Yield—14.8 g., M.P. 111–113° C.

The other dicarboximidoalkyl tetrahydroquinoline couplers can be prepared by the methods of Examples 1 and 2 by reaction of the appropriate anhydride with the appropriate N-aminoalkyltetrahydroquinoline.

EXAMPLE 3.—PREPARATION OF AZO COMPOUND

The azo compounds may be prepared from the 2-aminobenzothiazoles and coupler compounds such as those of Examples 1 and 2, by one of the two following methods.

*Method A*

*Diazotization.*—11.4 g. (0.05 m.) 2 amino-6-methylsulfonylbenzothiazole was suspended in 120 ml. of water, and to this was added 131 g. concentrated sulfuric acid. The amine dissolved immediately. The solution was cooled to —5° C. and a solution of 4.2 g. of sodium nitrite in 46.4 g. concentrated sulfuric acid was added below 0° C. The mixture was stirred 1¾ hr., keeping the temperature below 0° C. At this point, the reaction mixture was a clear, brown solution.

*Coupling.*—The coupling solution was prepared by dissolving 16.72 g. (0.05 m.) N-β-phthalimidoethyl-2,7-dimethyl-1,2,3,4-tetrahydroquinoline coupler in 250 cc. 1:5 acid (1 part propionic acid to 5 parts acetic acid). The coupling solution was cooled in an ice bath and the diazonium solution was added slowly, with stirring. The mixture was allowed to couple 3 hours at the ice-bath temperature. The mixture was then drowned in water, filtered, washed with water, and dried. The product dyed the polyester fibers Dacron and Kodel blue-red shades of good brightness and fastness properties. Somewhat bluer shades were obtained on cellulose acetate fibers. The azo compound has the formula

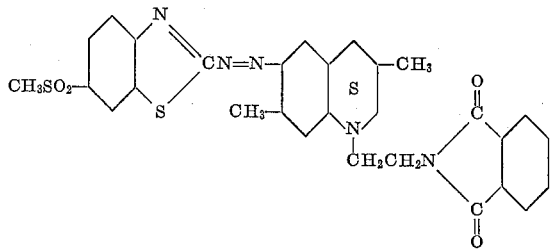

*Method B*

*Diazotization.*—0.76 g. (0.011 m.) sodium nitrite was added portionwise to 5 ml. concentrated sulfuric acid. This solution of nitrosyl sulfuric acid was cooled in an ice bath and 10 ml. 1:5 acid was added, keeping the temperature below 20° C. This solution was then cooled to 5° C., and 1.75 g. (0.01 m.) 2-amino-6-cyanobenzothiazole was added, followed by 10 ml. 1:5 acid. The mixture was stirred 2½ hours at ice-bath temperature.

*Coupling.*—Coupling is carried out in the same manner as in Method A using the same coupler. The azo compound obtained dyes polyester fibers brilliant pink shades with good fastness properties.

EXAMPLE 4

*Diazotization.*—1.5 g. of 2-aminobenzothiazole was suspended in 48 cc. of water and 53 g. concentrated $H_2SO_4$ added. The solution was cooled to —5° C. and a solution of 1.68 g. of $NaNO_2$ in 18.6 g. of $H_2SO_4$ was added below 0° C.

*Coupling.*—3.06 g. of N-β-phthalimidoethyl 1,2,3,4-tetrahydroquinoline coupler was dissolved in 100 cc. of 1:5 (propionic-acetic) acid. The solution was cooled to 0° C. and the diazo solution prepared above was added slowly below 5° C. wtih good stirring. After 2 hr. in the ice-bath, the mix was drowned in 5 volumes of water, filtered, washed wtih water and air-dried. The dye imparts violet shades to cellulose ester and polyester fibers.

EXAMPLE 5

The procedure of Example 3, Method A is used except that the diazo component was 9.75 g. of 2-amino-6-nitrobenzothiazole, and the coupler was 14.3 g. of N-β-succinimidoethyl - 2,7-dimethyl-1,2,3,4-tetrahydroquinoline. The product dyes cellulose acetate and polyester fibers in blue-violet shades.

EXAMPLE 6

The procedure of Example 4 is used except that the coupler was 2.58 g. of N-β-succinimido-1,2,3,4-tetrahydroquinoline and the diazo component was 1.76 g. of 2-amino-6-cyanobenzothiazole. The product imparts bright violet shades to cellulose acetate fibers.

EXAMPLE 7

The procedure of Example 4 is used except that the diazo component was 1.78 g. of 2-amino-6-methoxybenzothiazole. The product dyed polyester fabrics in bright red shades.

EXAMPLE 8

The procedure of Example 3, Method A is used except that the diazo component was 13.4 g. of 2-amino-6-β-cyanoethylsulfonylbenzothiazole and the coupler 14.3 g. of N-β-succinimidoethyl-2,7-dimethyltetrahydroquinoline. Bright reddish-blue shades were imparted by the product to polyester fibers.

EXAMPLE 9

The procedure of Example 4 is used except that 1.76 g. of 2-amino-6-cyanobenzothiazole is used as the diazo component and the coupler used is 3 g. of N-γ-succinimidopropyl - 2,2,4,7-tetramethyl-1,2,3,4-tetrahydroquinoline. Bright violet shades were imparted by the product to cellulose acetate and polyester fabrics.

EXAMPLE 10

The procedure of Example 3, Method A is used except that the coupler was 14.3 g. of N-β-succinimidoethyl-2,7-dimethyl-1,2,3,4-tetrahydroquinoline. Polyester fabrics were dyed in pink shades by the product.

EXAMPLE 11

The procedure of Example 3, Method A is used except that the coupler was 12.9 g. of N-β-succinimidoethyl-1,2,3,4-tetrahydroquinoline. Polyester fabrics were dyed in bluish-red shades by the product.

EXAMPLE 12

The procedure of Example 3, Method A is used except that the coupler used is N-β-succinimidoethyl-2,2,4,7-tetramethyl-1,2,3,4-tetrahydroquinoline. The product dyes cellulose acetate fibers violet shades.

The azo compounds described in the following table are prepared in the manner of the above examples using the indicated diazotized 2-aminothiazoles and dicarboximidoalkyltetrahydroquinoline couplers. $Y_{n-1}$, $R_2$, $R_4$ and Z refer to the general formulas above wherein $R_1$ and $R_3$ are hydrogen atoms. Thus, the azo compound of Example 4 described in the first line of the table, for illustration, is prepared from 2-aminobenzothiazole and N-β-phthalimido-1,2,3,4-tetrahydroquinoline as described in detail in Example 4 above. In the table, the color of the dyeings refers to the color obtainable by dyeing a cellulose acetate fabric with the azo compounds.

As will be apparent from Examples 1–12 and the examples of the table, the radicals, R, $R_1$, $R_2$, $R_3$, $R_4$, Y and Z may be varied widely to produce azo compounds having good dyeing properties. In particular, in the radical

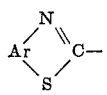

representing the benzothiazole radical of the azo compounds, Ar is a monocyclic arylene radical of the benzene series, especially an o-phenylene radical, unsubstituted or substituted, by one of the following radicals: alkyl, especially lower alkyl; alkoxy, especially lower alkoxy and dialkoxy; halogen, e.g., bromine and iodine; carbalkoxy, e.g., —COOCH$_3$; hydroxyalkyl, e.g., hydroxyethyl; alkoxyalkyl, e.g., methoxyethyl; phenoxyalkyl, e.g., phenoxyethyl; alkylthio, e.g., ethylthio; alkylsulfonyl, e.g., methylsulfonyl; phenylalkylsulfonyl, e.g., benzylsulfonyl; phenylalkylthio, e.g., benzylthio; acyl, e.g., acetyl; acetamido; acyloxy, e.g., acetoxy; carbamoyl, e.g., phenylcarbamoyl; cyano; acetoxyalkyl, e.g., β-acetoxyethyl; hydroxyl; nitro; alkylsulfonamido, e.g., methylsulfonamido; phenylalkoxy, e.g., benzyloxy; hydroxyalkoxy, e.g., β-hydroxyethoxy; haloalkoxy, e.g., β-chloroethoxy; phenoxyalkoxy, e.g., β-phenoxyethoxy; β(β'-phenoxyalkoxy)alkoxy, e.g., β(β'-phenoxyethoxy)ethoxy; carbalkoxyalkyl, e.g., —(CH$_2$)$_2$COOCH$_3$; acylaminoalkyl, e.g., acetylaminoethyl; alkylcarbamoylalkyl, e.g., β-methylcarbamoylethyl; cyanoalkyl, e.g., β-cyanoethyl; hydroxyalkylsulfonyl, e.g., hydroxyethylsulfonyl; cyanoalkylsulfonyl, e.g., cyanomethylsulfonyl; cyanoalkylthio, e.g., cyanoethylthio.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of cellulose acetate fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber yarn and fabric form, is representative of polyamides which can be dyed with the azo compounds.

DICARBOXIMIDOALKYL TETRAHYDROQUINOLINE COUPLER

| 2-aminobenzo thiazole diazotized | Z | $R_4$ | $R_2$ | $Y_{n-1}$ | Method used | Color of dyeings |
|---|---|---|---|---|---|---|
| Unsubstituted | Phthalimido | —CH$_2$CH$_2$— | H | H | Ex. 4 | Violet. |
| 6-methylsulfonyl | Succinimido | —CH$_2$CH$_2$— | Methyl | H | Ex. 3A | Do. |
| Do | do | —CH$_2$CH$_2$— | do | 7-methyl | Ex. 3A | Do. |
| Do | do | —CH$_2$CH$_2$— | H | H | Ex. 3A | Do. |
| Do | do | —CH$_2$CH$_2$— | Isopropyl | 7-methyl | Ex. 3A | Do. |
| Do | do | —CH$_2$CH$_2$CH$_2$— | do | do | Ex. 3A | Do. |
| Do | do | —CH(CH$_3$)CH$_2$CH$_2$— | do | do | Ex. 3A | Do. |
| Do | do | —CH$_2$CH$_2$— | do | 7-chloro | Ex. 3A | Do. |
| Do | do | —CH$_2$CH$_2$— | do | 7-methoxy | Ex. 3A | Do. |
| Do | Maleimido | —CH$_2$CH$_2$— | Methyl | 7-methyl | Ex. 3A | Do. |
| Do | Hexahydrophthalimido | —CH$_2$CH$_2$— | do | do | Ex. 3A | Do. |
| Do | 3-nitrophthalimido | —CH$_2$CH$_2$— | do | do | Ex. 3A | Do. |
| 6-cyano | Succinimido | —CH$_2$CH$_2$— | do | do | Ex. 3A | Pink. |
| 6-sulfamyl | do | —CH$_2$CH$_2$— | do | do | Ex. 3A | Violet. |
| 6-β-hydroxyethylsulfonyl | do | —CH$_2$CH$_2$— | do | do | Ex. 3A | Do. |
| 6-ethylsulfonyl | do | —CH$_2$CH$_2$— | do | do | Ex. 3A | Do. |
| 6-butylsulfonyl | do | —CH$_2$CH$_2$— | do | do | Ex. 3A | Do. |
| 6-cyanomethylsulfonyl | do | —CH$_2$CH$_2$— | do | do | Ex. 3A | Do. |
| 6-methyl | do | —CH$_2$CH$_2$— | do | do | Ex. 3B | Pink. |
| 6-methylthio | do | —CH$_2$CH$_2$— | do | do | Ex. 3B | Do. |
| 4,6-dichloro | do | —CH$_2$CH$_2$— | do | do | Ex. 3B | Do. |
| 6-bromo | do | —CH$_2$CH$_2$— | do | do | Ex. 3B | Do. |
| 6-β-cyanoethylthio | do | —CH$_2$CH$_2$— | do | do | Ex. 3B | Do. |
| 6-acetamido | do | —CH$_2$CH$_2$— | do | do | Ex. 3B | Do. |
| 6-acetamido | Glutarimido | —CH$_2$— | do | do | Ex. 3B | Do. |

The invention has ben described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the general formula

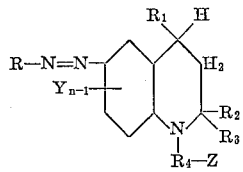

wherein
R = a 2-benzothiazolyl radical,
$R_1$, $R_2$ and $R_3$ each equal a member of the class consisting of a hydrogen atom and a lower alkyl group,
$R_4$ = a lower alkylene group,
Y = a member of the class consisting of lower alkyl, lower alkoxy, chlorine and bromine,
n = a positive integer from 1 to 2, and
Z = a dicarboximido radical.

2. Azo compounds according to claim 1 wherein $R_4$ is an ethylene group.

3. Azo compounds according to claim 1 wherein R is a 6-methylsulfonyl-2-benzothiazolyl radical.

4. Azo compounds according to claim 1 wherein
R = a 2-benzothiazolyl radical,
$R_4$ = a lower alkylene group,
Z = a succinimido radical, and at least one of $R_1$, $R_2$, $R_3$ and $Y_{n-1}$ is a methyl group and the remainder are hydrogen atoms.

5. Azo compounds according to claim 1 wherein
R = a 2-benzothiazolyl radical,
$R_4$ = —$CH_2CH_2$—,
Z = a succinimido radical, and at least one of $R_1$, $R_2$, $R_3$ and $Y_{n-1}$ is a methyl group and the remainder are hydrogen atoms.

6. Azo compounds according to claim 1 wherein
R = a 2-benzothiazolyl radical,
$R_4$ = a lower alkylene group,
Z = a phthalimido radical, and at least one of $R_1$, $R_2$, $R_3$ and $Y_{n-1}$ is a methyl group and the remainder are hydrogen atoms.

7. Azo compounds according to claim 1 wherein
R = a 2-benzothiazolyl radical,
$R_4$ = —$CH_2CH_2$—,
Z = a phthalimido radical, and at least one of $R_1$, $R_2$, $R_3$ and $Y_{n-1}$ is a methyl group and the remainder are hydrogen atoms.

8. A compound having the formula

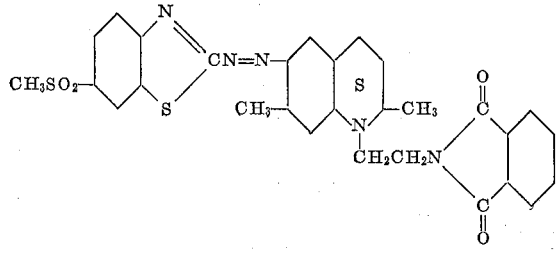

9. A compound having the formula

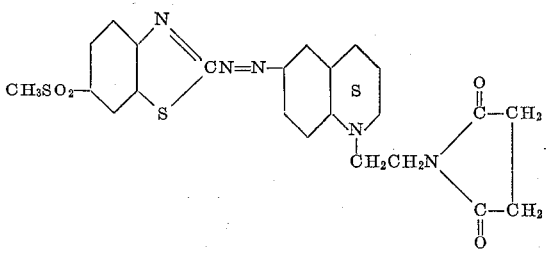

10. A compound having the formula

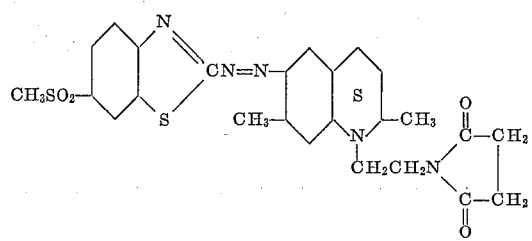

11. A compound having the formula

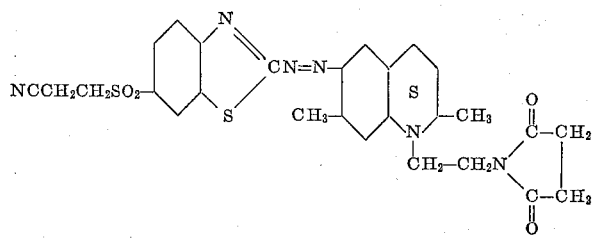

12. A compound having the formula

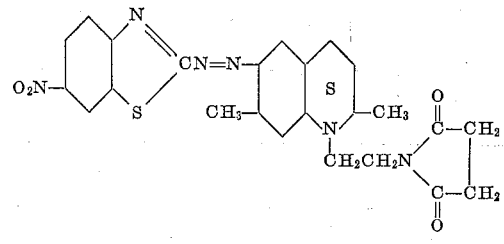

References Cited by the Examiner

UNITED STATES PATENTS

| | | | |
|---|---|---|---|
| 2,283,211 | 5/42 | Jones et al. | 260—155 |
| 2,839,523 | 6/58 | Towne et al. | 260—155 |
| 2,955,901 | 10/60 | Kruckenberg | 8—41 |
| 2,972,508 | 2/61 | Kruckenberg et al. | 8—41 |

CHARLES B. PARKER, *Primary Examiner.*